US008806108B2

(12) United States Patent
Suzuki et al.

(10) Patent No.: US 8,806,108 B2
(45) Date of Patent: Aug. 12, 2014

(54) SEMICONDUCTOR STORAGE APPARATUS AND METHOD OF CONTROLLING SEMICONDUCTOR STORAGE APPARATUS

(75) Inventors: Akifumi Suzuki, Nakai (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 13/141,930

(22) PCT Filed: Jun. 7, 2011

(86) PCT No.: PCT/JP2011/003187
§ 371 (c)(1),
(2), (4) Date: Jun. 23, 2011

(87) PCT Pub. No.: WO2012/168960
PCT Pub. Date: Dec. 13, 2012

(65) Prior Publication Data
US 2012/0317334 A1 Dec. 13, 2012

(51) Int. Cl.
*G06F 12/00* (2006.01)
(52) U.S. Cl.
USPC .............. 711/103; 711/E12.008; 365/185.33

(58) Field of Classification Search
USPC ................. 711/103, E12.008; 365/185.33
See application file for complete search history.

(56) References Cited

U.S. PATENT DOCUMENTS

| | | | |
|---|---|---|---|
| 2009/0150605 A1* | 6/2009 | Flynn et al. | 711/112 |
| 2010/0030946 A1* | 2/2010 | Kano et al. | 711/103 |
| 2010/0281340 A1 | 11/2010 | Franceschini et al. | |
| 2012/0072644 A1* | 3/2012 | Asano et al. | 711/103 |

FOREIGN PATENT DOCUMENTS

WO   2008/070173 A1   6/2008

* cited by examiner

*Primary Examiner* — Jasmine Song
(74) *Attorney, Agent, or Firm* — Volpe and Koenig, P.C.

(57) ABSTRACT

A semiconductor storage apparatus including a flash memory which provides a storage area, and a memory controller which controls the reading and writing of data from and to the flash memory, wherein the storage area of the flash memory is configured from a plurality of write areas, and wherein the memory controller divides the data into a size corresponding to the write area, and changes the starting location of writing the data each time the divided data is written into the write area.

11 Claims, 16 Drawing Sheets

FIG. 5

| LBA | PBA | NUMBER OF ECC CWS | COMPRESSED DATA LENGTH | OFFSET |
|---|---|---|---|---|
| 0x00000000 | 0x0030A000 | 4 | 3826B | 0B |
| 0x00001000 | 0x0F001000 | 3 | 3024B | 3012B |
| 0x00002000 | UNASSIGNED | — | — | — |
| 0x00003000 | 0x5810D000 | 2 | 1984B | 224B |
| ~ | ~ | ~ | ~ | ~ |
| 0xFFFFE000 | 0x34FF2000 | 4 | UNCOMPRESSED | 0B |
| 0xFFFFF000 | UNASSIGNED | — | — | — |
| 501 | 502 | 503 | 504 | 505 |

| LBA | PBA |
|---|---|
| 0x00000000 | 0x0030A000 |
| 0x00001000 | 0x0F001000 |
| 0x00002000 | UNASSIGNED |
| 0x00003000 | 0x5810D000 |
| ⸳ | ⸳ |
| 0xFFFFE000 | 0x34FF2000 |
| 0xFFFFF000 | UNASSIGNED |

| PBA GROUP | ERASE COUNT | NUMBER OF ECC CWS | CUMULATIVE DEGREE OF DETERIORATION | LAST WRITE PAGE |
|---|---|---|---|---|
| 0x00000000 | 142 | 4 (UNCOMPRESSED) | 102.5 | 12 |
| 0x00080000 | 5316 | 3 | 4252.8 | 42 |
| 0x00100000 | 2345 | 2 | 1872.0 | 127 |
| 0x00180000 | 30 | INVALID | 12.5 | - |
| ⋮ | ⋮ | ⋮ | ⋮ | ⋮ |
| 0xFFF00000 | 0 | 4 (UNCOMPRESSED) | 0 | 127 |
| 0xFFF80000 | 4561 | 3 | 3653 | 38 |

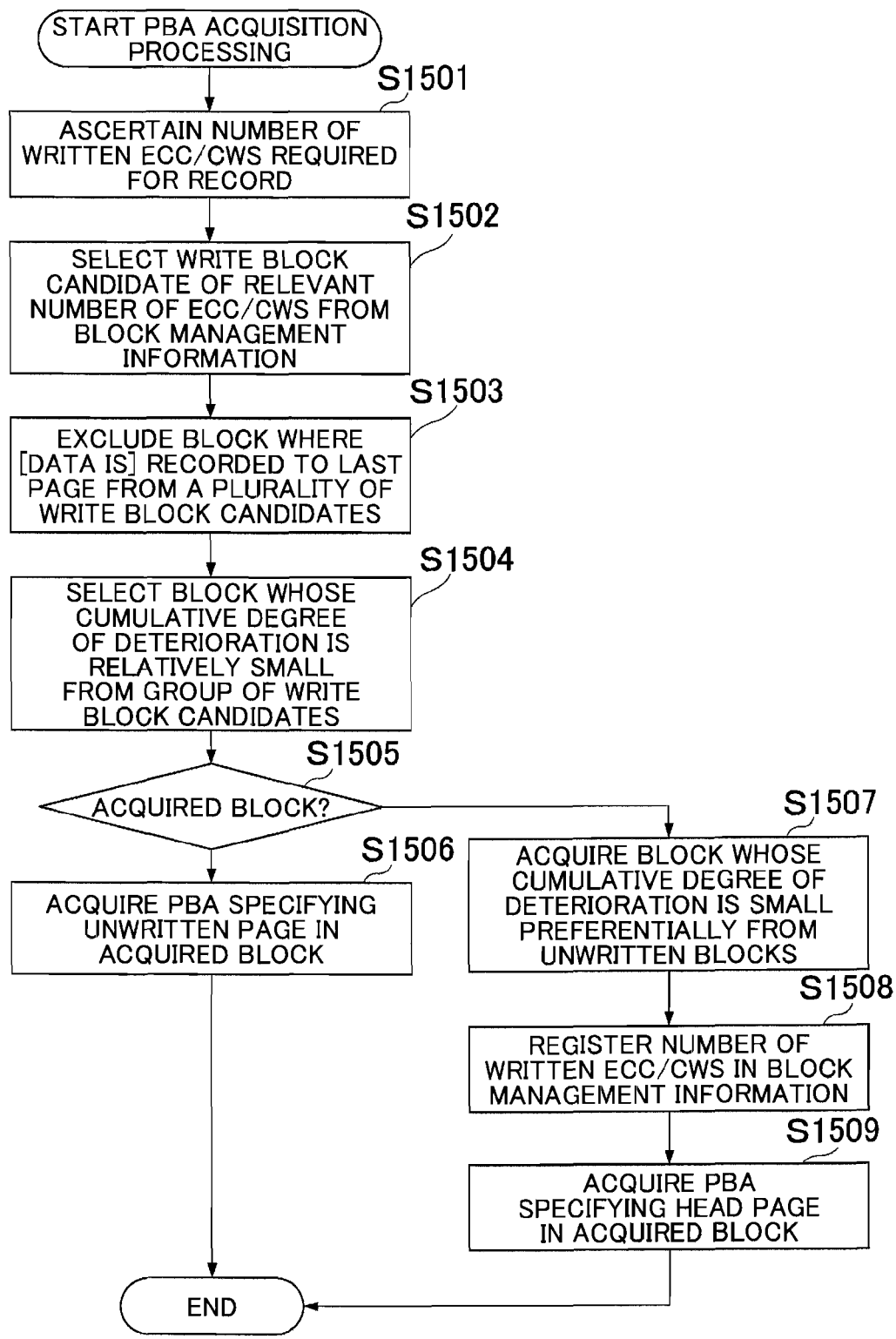

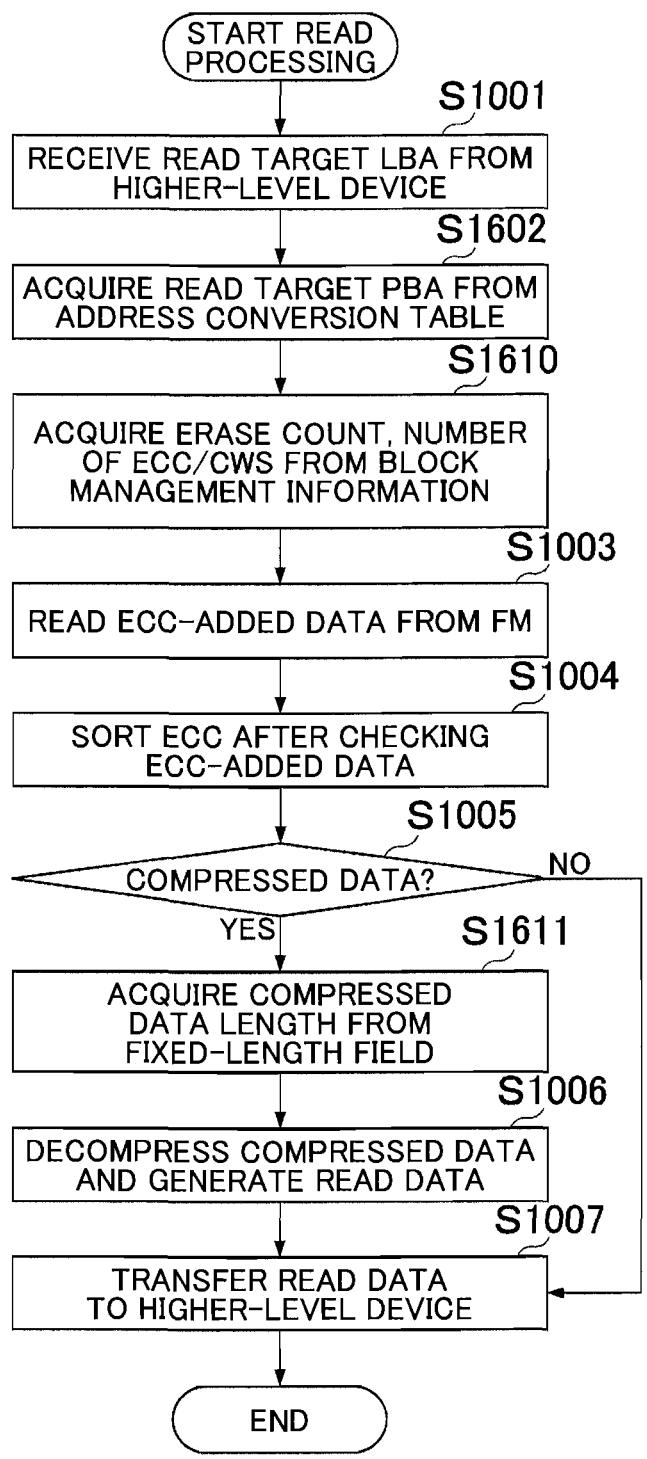

SEMICONDUCTOR STORAGE APPARATUS AND METHOD OF CONTROLLING SEMICONDUCTOR STORAGE APPARATUS

TECHNICAL FIELD

The present invention relates to a semiconductor storage apparatus and a method of controlling the semiconductor storage apparatus, and is specifically suited for use in a semiconductor storage apparatus whose storage media is a flash memory which is a type of electrically rewritable non-volatile memory and a control method of the same.

BACKGROUND ART

A flash memory comprises a two-layered gate electrode comprising a floating gate where charge can be retained on an oxidized insulation layer, and an oxidized insulation layer and a control gate are placed on the same. For storing data in an internal cell of the flash memory (storage of data is hereinafter also referred to as programming), electrons are transmitted to the floating gate by penetrating the oxidized insulation layer. Furthermore, for erasing the data stored in the internal cell (erasing of data is hereinafter also referred to as erasure), the electrons are extracted from the floating gate by penetrating the oxidized insulation layer. Therefore, in the flash memory, load on the oxidized insulation layer occurs each time the operations of programming and erasure are repeated, and the insulation performance of the oxidized insulation layer is gradually deteriorated. Subsequently, if the insulation performance of the oxidized insulation layer is deteriorated, it becomes impossible to store electrons in the internal cell of the flash memory for a long time, and it becomes difficult to retain the storage data accurately. This type of deterioration of the insulation performance of the oxidized insulation layer is referred to as flash memory deterioration.

As explained above, the flash memory is a device which is inevitably deteriorated due to the mechanism of data storage. Subsequently, this deterioration deteriorates the probability of continuing to store storage data accurately. Hereinafter, the probability of continuing to store storage data accurately is referred to as "data retaining reliability". Generally, in a semiconductor storage apparatuses whose storage media is a flash memory, for the purpose of retaining the above-mentioned data retaining reliability, the upper limit value of the erase count is specified per storage area of the flash memory. Subsequently, the storage area of the flash memory which exceeds the upper limit value of the specified erase count is disabled, and a spare storage area is used as an alternate. If there is no alternate storage area ultimately, the utilization of the relevant storage apparatus is suspended.

Meanwhile, the flash memory comprises the characteristic of disabling data overwriting in the storage area. Therefore, for updating data, the operation of erasing the previous data and writing the update data in the area where the data was erased must be performed. Therefore, for updating the data stored in the flash memory, it is inevitable that the storage area is erased and that the erase count in the flash memory is determined in accordance with the amount of the update data. Specifically speaking, the period for which the storage apparatus can be utilized (hereinafter referred to as a life of the apparatus) depends on the total amount of the data to be written to or updated in the semiconductor storage apparatus.

Therefore, for reducing the total amount of data to be written to or updated in the semiconductor storage apparatus, lifetime extension of the apparatus is sought by performing lossless compression (hereinafter simply referred to as compression) for the data. For example, Patent Literature 1 discloses the technology of compressing storage data, converting the write data into a highly-reliable data pattern in accordance with the compression effect which indicates what amount of write data is reduced by the compression, and writing the data in the flash memory. Furthermore, in Patent Literature 1, for an ECC (Error Correction Code) which cannot be converted into a highly-reliable data pattern which reduces deterioration, the technology of sequentially changing the programming location and leveling the deterioration caused by the programming through the areas in the page is disclosed. By this type of technology, the lifetime extension of the apparatus is realized by reducing the amount of the deterioration caused per erase count and increasing the upper limit value of the erase count capable of maintaining the data retaining reliability.

CITATION LIST

Patent Literature

PTL 1: Specification of US Patent Application Publication No. 2010/0281340

SUMMARY OF INVENTION

Technical Problem

Here, the restriction related to the data storage method in the flash memory is explained. For the flash memory, the minimum unit of data to be programmed is specified, and this minimum unit is referred to as a page. The relevant page comprises a restriction that, once data is stored, overwriting is not allowed until the data is erased. Due to this type of restriction on the flash memory, if write data is compressed in units of page sizes to reduce the amount of the write data and is stored in the flash memory, an area (unprogrammed area) in which no data is stored or for which no addition can be performed will occur in the page.

Subsequently, if the operation of programming the compressed data below the page size sequentially from the head of the page is repeated, the area close to the head of the page becomes the area whose programming frequency is high, and the programming frequency becomes uneven in the same page. Subsequently, the area whose programming frequency is high, where the number of electrons which penetrated the oxidized insulation layer becomes large, is relatively deteriorated compared with the area whose programming frequency is low. Consequently, the deteriorated area and the non-deteriorated area will be mixed relatively in the page. Furthermore, if only a specific area in the page is deteriorated and the data retaining reliability is deteriorated, the data retaining reliability of the entire page is maintained even if the other areas maintain the data retaining reliability, and therefore the relevant page must be disabled. Therefore, there is a problem that, even if the amount of the write data is reduced by compression in units of page sizes, the upper limit value of the erase count in page units cannot be increased and that the lifetime extension of the entire apparatus cannot be achieved.

For solving the above-mentioned problem, it is desirable to level the programming frequency of the compressed data for the storage areas in the page and reduce the programming count per cell in the page. If the programming count per cell in the page is decreased, the upper limit value of the erase count for which the reliability can be maintained in page units can be increased and lifetime extension of the entire apparatus can be achieved.

As explained above, Patent Literature 1 discloses that the data programming frequency is leveled by sequentially changing the location of the ECC, but the performance improvement by reducing the amount of write data cannot be expected because the data which is reduced by compression is increased again by conversion into the highly-reliable data pattern. Furthermore, in Patent Literature 1, although the location of the ECC is changed in accordance with the data protected by the ECC, the data must be input to an ECC check circuit at the time of an ECC check, and therefore a mechanism of changing the order of data input to the ECC check circuit becomes required.

The present invention was devised in view of the above-mentioned items, and its object is to propose a semiconductor storage apparatus and the control method of the same capable of achieving the lifetime extension of the apparatus by increasing the specified upper limit value of the erase count in the flash memory and also seeking to improve the performance of the apparatus by reducing the data transfer amount to the flash memory.

Solution to Problem

For solving such problems, the present invention provides a semiconductor storage apparatus including a flash memory which provides a storage area, and a memory controller which controls the reading and writing of data from and to the flash memory, wherein the storage area of the flash memory is configured from a plurality of write areas, and wherein the memory controller divides the data into a size corresponding to the write area, and changes the starting location of writing the data each time the divided data is written into the write area.

According to such configuration, in writing data to the flash memory configured from a plurality of write areas, the data is divided by the size corresponding to the relevant write areas, and the starting location of writing the data is changed each time the divided data is written to the write areas. By this method, it is possible to level the write frequency to the storage areas, prevent sole excessive deterioration of a specific area in the write areas, and realize the lifetime extension of the semiconductor storage apparatuses.

Advantageous Effects of Invention

According to the present invention, it is possible to achieve the lifetime extension of the apparatus and seek to improve the performance of the apparatus.

BRIEF DESCRIPTION OF DRAWINGS

FIG. 5 is a diagram showing the contents of an address conversion table related to the same embodiment.

FIG. 11 is a diagram showing the contents of an address conversion table related to Embodiment 2 of the present invention.

FIG. 12 is a diagram showing the contents of block management information related to the same embodiment.

FIG. 15 is a flowchart showing the processing procedure of the write processing related to the same embodiment.

FIG. 16 is a flowchart showing the processing procedure of the read processing related to the same embodiment.

DESCRIPTION OF EMBODIMENTS

An embodiment of the present invention will be explained below with reference to the attached drawings.

(1) Embodiment 1

(1-1) Configuration of Semiconductor Storage Apparatus

Figure 1:
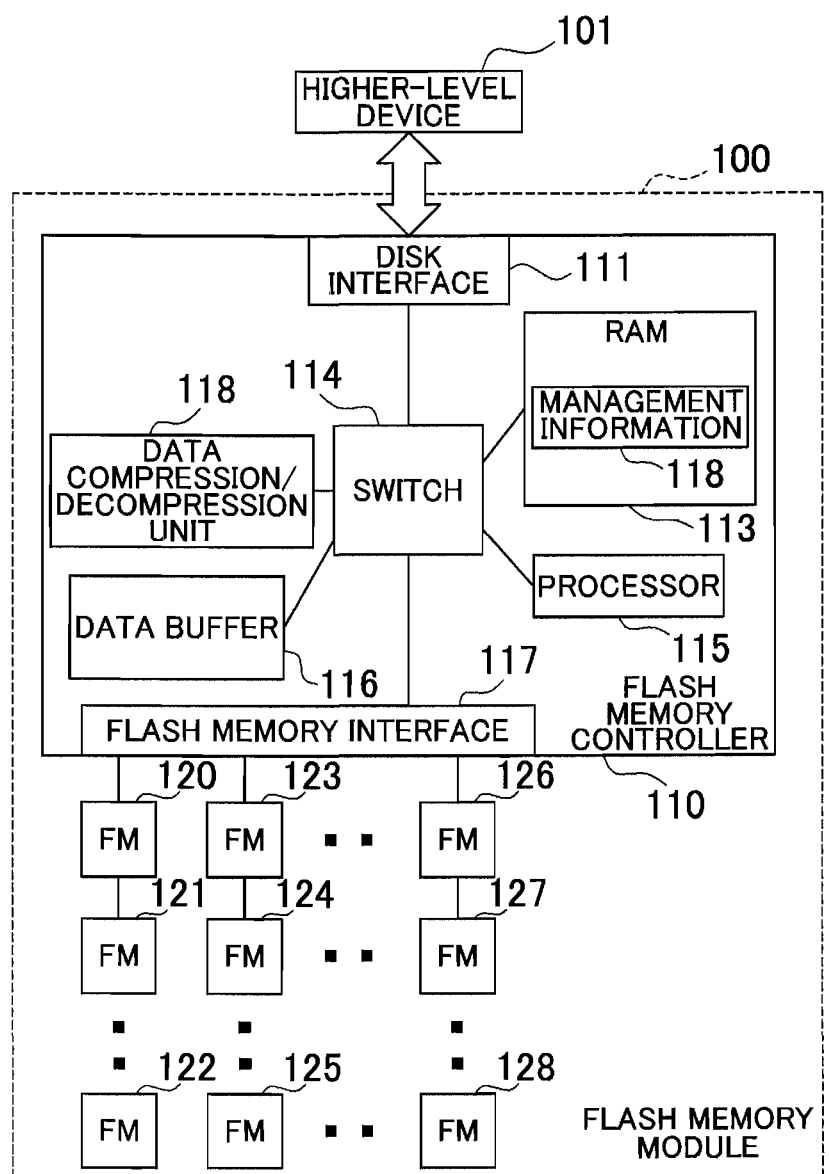
FIG. 1 is a skeleton framework of a semiconductor storage apparatus related to Embodiment 1 of the present invention.

Firstly, the configuration of a semiconductor storage apparatus 100 related to the present embodiment is explained. As shown in FIG. 1, the semiconductor storage apparatus 100 is connected communicably to a higher-level device 101.

The semiconductor storage apparatus 100 is configured from a flash memory controller 110 and a plurality of flash memories 120 to 128 (e.g. 32 units). The flash memory controller 110 is configured from a disk interface 111, a RAM (Random Access Memory) 113, a switch 114, a processor 115, a data buffer 116, a flash memory interface 117, and a data compression/decompression unit 118.

The disk interface 111 is connected to the storage apparatus or the higher-level device 101 such as the server and is connected to the respective units in the flash memory controller 110 via the switch 114. The disk interface 111 receives read/write requests, LBAs ((Logical Block Addresses) specifying the logical storage locations of the request targets, and write data at the time of writing requests from the higher-level device 101. Furthermore, if receiving a control command of the semiconductor storage apparatus 100, in accordance with the received command, the disk interface 111 notifies the higher-level device of the operational status, the usage status and the current set values of the semiconductor storage apparatus 100.

The RAM 113 is, specifically speaking, configured from a non-volatile memory such as a DRAM (Dynamic RAM) and, in this RAM 113, various types of programs for controlling the operation of the flash memory controller 110, management information of the flash memories 120 to 128, a transfer list including transfer control information to be used by each of the DMAs, and others are stored. It should be noted that the RAM 113 may also include a part or all of the functions of the data buffer 116 which stores the data.

The switch 114 connects the disk interface 111, the RAM 113, the processor 115, the data buffer 116, the flash memory interface 117, and the data compression/decompression unit 118 in the flash memory controller 110, routes and transfers the data among the respective components by addresses or IDs.

The processor 115 is connected to the respective parts of the flash memory controller 110 via the switch 114 and performs integrated control for the entire flash memory controller 110 in accordance with the various types of programs and the management information stored in the RAM 113. Furthermore, the processor 115 monitors the entire flash memory controller 110 by regular information acquisition and an interrupt reception function.

The data buffer 116 stores temporary data in process of the data transfer processing in the flash memory controller 110.

The flash memory interface 117 is connected to the plurality of flash memories 120 to 128 via a plurality of buses (e.g. 16 units). A plurality of flash memories (e.g. 2 units) are connected to each of the buses, and the flash memory interface 117 performs independent control for the plurality of flash memories connected to the same bus by using a CE (Chip Enable) signal. Furthermore, the flash memory interface operates in accordance with the read/write request from the processor 115. In this case, the flash memory interface 117 receives the request target by a physical block address (PBA). The flash memory interface 117 ascertains the flash memories 120 to 128, blocks and pages by the PBAs, and performs the read/write requests specifying the blocks and pages for the request target flash memories.

Furthermore, the flash memory interface 117 reads the stored data from the flash memories 120 to 128 at the time of reading and transfers the read data to the data buffer 116. Meanwhile, at the time of writing, the flash memory interface 117 reads the write data from the data buffer 116 and writes the read data to the flash memories 120 to 128.

Furthermore, the flash memory interface 117 is configured from an ECC generation circuit, a data loss detection circuit by the ECC, and an ECC correction circuit and, at the time of writing, adds an ECC to the data by the ECC generation circuit and writes the data. Meanwhile, at the time of reading, the flash memory interface 117 checks the read data from the flash memories 120 to 128 by the data loss detection circuit by the ECC. Furthermore, if the data loss is detected, the flash memory interface 117 performs data correction by the ECC correction circuit, and stores the number of corrected bits in the RAM 113.

The data compression/decompression unit 118 comprises a function of processing an algorithm of lossless compression and comprises a plurality of algorithms and a function of changing the compression level. The data compression/decompression unit 118 reads data from the data buffer 116 under control of the processor 115 and, by performing a data compression operation by the algorithm of lossless compression and performing a data decompression operation which is the reverse conversion of data compression, writes the result of the operations to the buffer again. It should be noted that the data compression/decompression unit 118 may also be installed as a logical circuit in the flash memory controller 110 and may also achieve the same function as the data compression/decompression unit 118 by performing a compression/decompression program in the processor 115.

The higher-level device 101 is, for example, a computer, a file server, or the storage apparatus to which a large number of semiconductor storage apparatuses as the core of the operational system are connected. The higher-level device 101 is configured from hardware resources such as a processor, a memory, a network interface and local input/output devices which are not shown in the figure, and is configured from software resources such as a device driver, an operating system (OS) and application programs. The higher-level device 101 performs communication with the semiconductor storage apparatus 100 and data read/write requests by performing the various types of programs under control of the processor. Furthermore, the higher-level device 101 acquires the management information such as the use status and operational status of the semiconductor storage apparatus 100 by performing the management program under control by the processor. Furthermore, the higher-level device 101 can specify or change the management unit of the semiconductor storage apparatus 100, the control method of the semiconductor storage apparatus 100, and the reliability of the required data.

It should be noted that the disk interface 111, the RAM 113, the switch 114, the processor 115, the data buffer 116, and the flash memory interface 117 which are explained above may be configured in one semiconductor factor by ASIC (Application Specific Integrated Circuit) or FPGA (Field Programmable Gate Array) and may also be configured by mutually connecting a plurality of individual dedicated ICs (Integrated Circuit).

(1-2) Data Configuration

Figure 2:
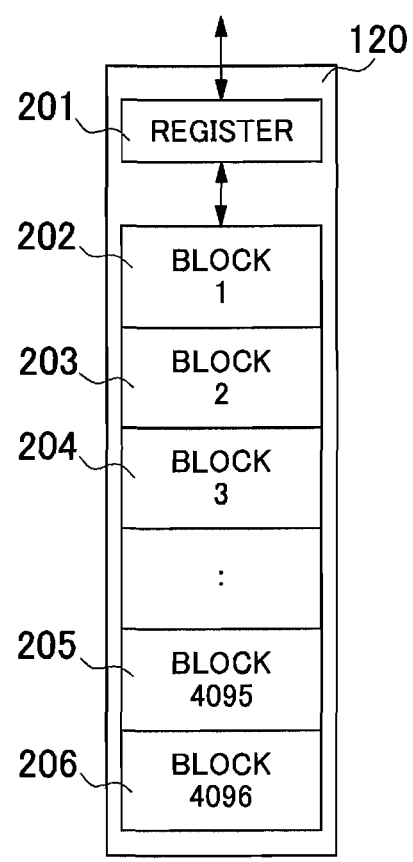
FIG. 2 is an internal configuration diagram of a flash memory related to the same embodiment.

Next, the internal configuration of the flash memory 120 is explained. As shown in FIG. 2, the flash memory 120 is configured from a register 201 and a plurality (e.g. 4096 units) of blocks 202 to 206. It should be noted that the other flash memories 121 to 128 also comprise the same configuration as the flash memory 120.

The register 201 is a register comprising the storage capacity of a page size (e.g. 4 KB+a spare area for an additional ECC) or larger, and the blocks 202 to 206 are data storage areas. In the flash memory 120, the data can be erased only in units of blocks.

The flash memory 120 operates in accordance with the instructions of the read/write requests from the flash memory interface 117 and, at the time of writing, firstly receives a write command, blocks as the request target, page numbers, and the programming starting locations in the pages from the flash memory interface 117. Subsequently, the flash memory 120 stores the write data transferred from the flash memory interface 117 in the register 201 sequentially from the addresses corresponding to the programming starting locations of the pages. Subsequently, the flash memory 120 receives a data transfer completion command, and also writes the data stored in the register 201 to the specified pages. Here, the cells in the pages corresponding to the address locations where the data is not stored in the register 201 become unprogrammed and the deterioration of the same is reduced.

Furthermore, at the time of reading, the flash memory 120 firstly receives a read command, blocks as the request target, and the page numbers from the flash memory interface 117. Subsequently, the flash memory 120 reads the data stored in the specified pages, and stores the same in the register 201. Subsequently, the flash memory 120 transfers the data stored in the register 201 to the flash memory interface 117.

Figure 3:
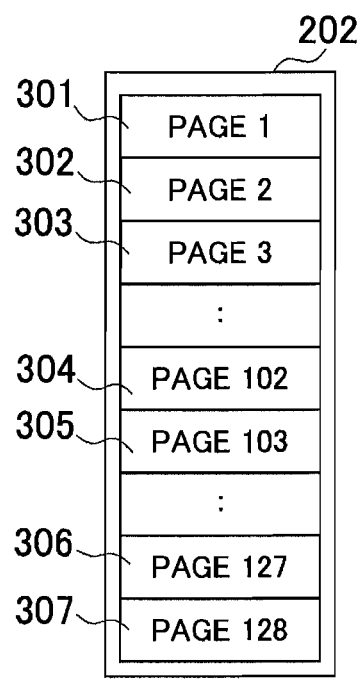
FIG. 3 is an internal configuration diagram of a block related to the same embodiment.

Next, the internal configuration of the block is explained. As shown in FIG. 3, the block 202 is configured from a plurality (e.g. 128 units) of pages 301 to 307. It should be noted that the other blocks 203 to 206 also comprise the same configuration as the block 202.

The pages 301 to 307 are the minimum data storage areas. The flash memory 120 performs data read/write in units of these pages. The order of writing data to the pages 301 to 307 is specified in advance, and the flash memory 120 writes data in order of 301, 302, 303, . . . , 307. Furthermore, overwriting in a page where data is already stored is prohibited, and no data is allowed to be stored in the page again until all the data stored in the block to which the page belongs is erased.

Therefore, the semiconductor storage apparatus 100 to which the invention of the present application is applied manages logical addresses (LBAs) specified by the higher-level device 101 and the addresses specifying the physical storage locations in the semiconductor storage apparatus 100 (PBAs) in different series, and manages table information where the LBAs and the PBAs are made to correspond to each other. By this table information, even if receiving an update write request for the data of the same LBA from the higher-level device 101, the flash memory 120 performs the processing of converting the PBA made to correspond to the LBA before the update into a new PBA indicating another page and writing the data to the storage area specified by the converted PBA. By the above-mentioned address conversion processing, the flash memory 120 can conceal the change of the actual physical storage area from the higher-level device 101. It should be noted that the PBA can uniquely specify an arbitrary page in the semiconductor storage apparatus 100, and comprises an address system where addresses are sequential in order of page numbers at least within the range of a data size for a block. For example, if a data size for a page is incremented for the PBA which specifies the page 3 of a certain block, the PBA becomes the PBA which specifies the page 4.

Figure 4:
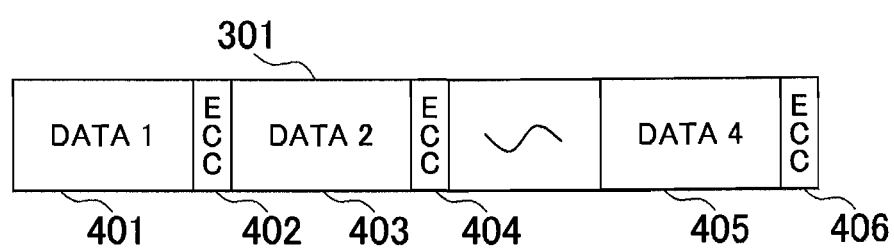
FIG. 4 is an internal configuration diagram of a page related to the same embodiment.

Next, the internal configuration of the page is explained. As shown in FIG. 4, the page 301 is configured from a plurality (e.g. 8 units) of data and ECCs. It should be noted that the other pages 302 to 307 also comprise the same configuration as the page 301.

The datum 401, 403, and 405 are configured from a certain number of bits (e.g. 4 KB), and each of the ECCs 402, 404, and 406 is stored next to the data to be guaranteed. Furthermore, by being stored next to the data 401, the ECC 402 configures one ECC/CW (ECC/Code Word) combined with the data. In case of FIG. 4, for example, the ECC 402 configures one ECC/CW (ECC/Code Word) with the data 401 (Data1). The data loss failure will occur if this number of failure bits per ECC/CW exceeds the number of bits that can be corrected by the ECC. It should be noted that, though the page 301 in FIG. 4 configures 4 ECC/CWs in the page, the configuration is not necessarily limited to this, and an arbitrary number of ECC/CWs may also be configured in accordance with the page size and the ECCs' intensity (the number of bits that can be corrected).

(1-3) Configuration of Various Types of Management Information

Next, the management information stored in the RAM 113 of the semiconductor storage apparatus 100 is explained. Firstly, an address conversion table 500 is explained. The address conversion table 500 is a table for managing the address correspondence between LBAs and PBAs and managing the data length and offset information of each of the blocks. As shown in FIG. 5, the address conversion table 500 is configured from an LBA field 501, a PBA field 502, a number of ECC/CWs field 503, a compressed data length field 504, and an offset field 505.

In the LBA field 501, the head address of a data range to be stored in a page is stored sequentially. In the PBA field 502, an address by which a page can be uniquely specified from a plurality of flash memories installed in the semiconductor storage apparatus 100 is stored. As explained above, an LBA is specified from the higher-level device 101 and a data read/write request is performed. Subsequently, the semiconductor storage apparatus 100 refers to the address conversion table 500, identifies the PBA corresponding to the LBA specified from the higher-level device 101, and performs the read/write processing for the storage area corresponding to the PBA. Meanwhile, if the LBA is not made to correspond to a PBA, "unassigned" is stored in the PBA field 502.

The number of ECC/CWs stored in a page is stored in the number of ECC/CWs field 503. The configuration where four ECC/CWs per page are stored is illustrated in FIG. 5. As shown in FIG. 5, the case where the number of ECC/CWs in a certain page is 3 indicates that three ECC/CWs and an unprogrammed area for the amount of one ECC/CW exist. It should be noted that the present embodiment is not limited to the case where the number of ECC/CWs stored in a page is four. For example, the configuration where one ECC/CW is stored per page may also be permitted.

The length of the compressed data which is protected by the ECC/CW (compressed data length) is stored in the compressed data length field 504. Furthermore, if the data stored in the flash memory is not compressed, the value indicating that the data is uncompressed is stored. The value stored in the compressed data length field 504 is used for determining whether the read/write target data is compressed data or uncompressed data, and is used by the data compression/decompression unit 118 for decompressing the compressed data. It should be noted that the example in which the compressed data length is stored by the management information stored in the RAM 113 is explained in the present embodiment, but the configuration in which the compressed data length is stored in the head of the page as the write target may also be permitted.

The value indicating the programming starting location for the data stored in the page is stored in the offset field 505. Hereinafter, the data programming starting location is referred to as an offset. It should be noted that, if the data stored in the page is uncompressed data, the storage data in the page is stored from the head of the page, and therefore 0B is stored in the offset field 505.

(1-4) Overview of Write Processing

Figure 6:
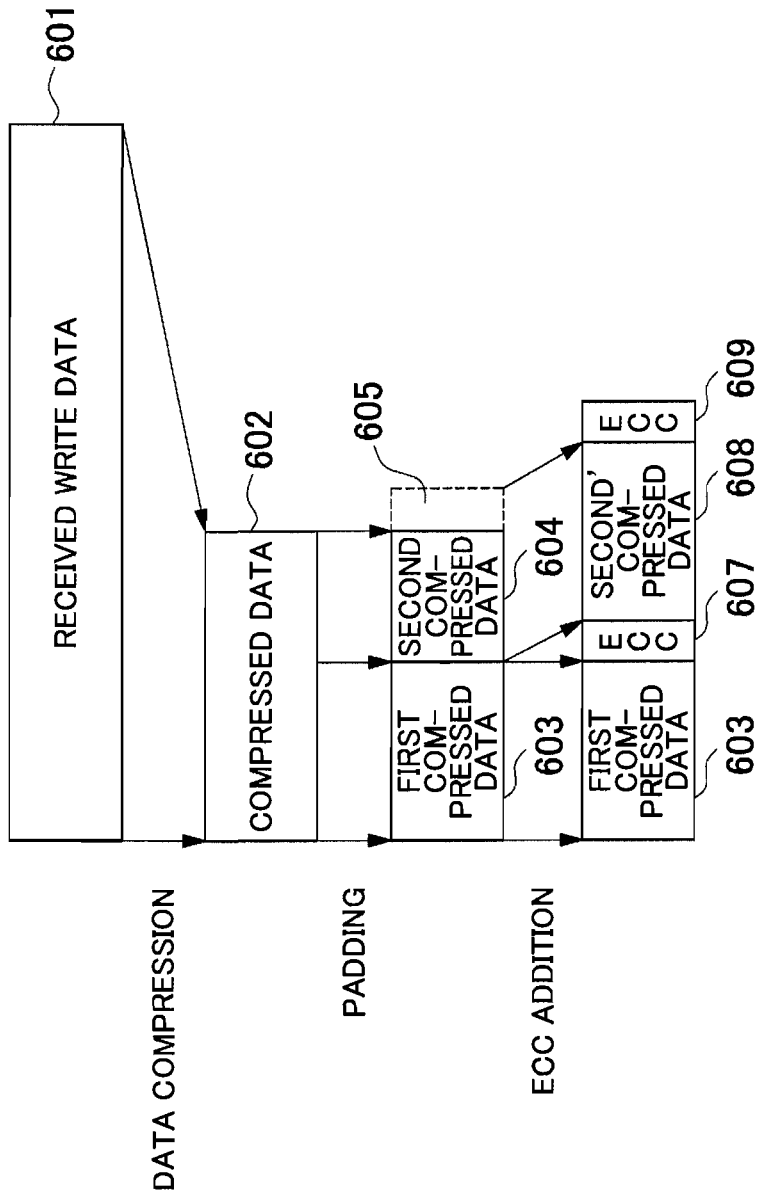
FIG. 6 is a conceptual diagram showing the overview of the write processing related to the same embodiment.

Next, the overview of the write processing performed by the processor 115 in the semiconductor storage apparatus 100 is explained. Firstly, the contents of the data stored in the flash memory by the write processing are explained with reference to FIG. 6. After receiving received write data and a write destination address from the higher-level device 101, the processor 115 divides the write data by the page size. The received write data 601 shown in FIG. 6 is the data divided from the received write data received from the higher-level device 101 by the page size. The processor 115 generates compressed data 602 from the received write data 601 by using the data compression/decompression unit 118.

Next, the processor 115 performs data padding for the data below the protected data length per ECC/CW. For example, the protected data length per ECC/CW is 1024 bytes, the processor 115 divides 1520-byte compressed data (compressed data 602) into 1024-byte data (second compressed data 603) and 496-byte data (second compressed data 604). Subsequently, the processor 115 adds 528-byte data for deterioration reduction to the 496-byte data (padding data 605) because the second compressed data 604 is below 1024 bytes which is the protected data length per ECC/CW. The data for deterioration reduction generally indicates 1 which is the value which does not have to transmit electrons to the floating gate penetrating the oxidized layer. Therefore, 1 is stored in all of the 528-byte padding data 605.

Subsequently, the padding data 605 is added to the second compressed data 604 and the padded second' compressed data 608 is generated. Next, the processor 115 generates and adds an ECC 607 and an ECC 609 to the first compressed data 603 and the second' compressed data 608. The data to which the ECCs generated by the above-mentioned process are added is hereinafter referred to as ECC-added data.

In the present embodiment, the received write data 601 received from the higher-level device 101 is generated into the first ECC-added data (603, 607) and the second ECC-added data (608, 609), and these units of ECC-added data (ECC/CWs) are transferred to the flash memories and stored. It should be noted that, though FIG. 6 shows the method in which the received write data 601 is divided into two ECC/CWs, the method is not limited to such example, and it is also possible to divide the data into an arbitrary number of ECC/CWs by the data compression rate or the ECC/CW length. For example, depending on the pattern of the received write data received from the higher-level device 101, it might be possible to store the data in one ECC/CW as the compression rate is high. In this case, the received write data 601 of the size of a page is written to the flash memory as the data of one ECC/CW length by the same method as above.

The present embodiment is characterized by changing the data programming starting location (offset) each time writing is performed for the pages in the flash memory and leveling the programming frequency per cell in the page.

The case where a plurality of times of write processing are performed in the same page is explained with reference to FIG. 7. It should be noted that, though two ECC/CWs are written in a plurality of times of write processing are explained in FIG. 7, the method is not limited to such example, and it is also possible to write the data of a different number of ECC/CWs each time write is performed.

Firstly, the status (page programming status 701) in the case where two ECC/CWs are written to the page whose erase count is 0 is explained. The two ECC/CWs written to the page whose erase count is 0 is written to the flash memory while changing the offset to 0 byte. Specifically speaking, the two ECC/CWs are programmed sequentially from the head of the page.

Next, the status (page programming status 702) in the case where the block to which the relevant page belongs is erased once and then the data is programmed in the same page again is explained. The two ECC/CWs written to the page whose erase count is one are written to the flash memory while changing the offset to 128 bytes. Specifically speaking, the two ECC/CWs are programmed sequentially from the 128th byte from the head of the page. Similarly, in the cases where the erase count is two or three, the offset is changed sequentially and the two ECC/CWs are written to the flash memory (page programming statuses 703, 704).

At this point, as for the offset value, the value by which the programming frequency is leveled per programming area (cell) in the page is set. For example, as explained above, considering the offset value to be 128 bytes, 128 bytes may also be added to the value of the offset each time data write is performed. In this case, if the value of the offset to which the 128 bytes are added becomes a value equal to or greater than the page size, the offset is changed to 0 bytes and 128 bytes are added to the offset value each time data is written again.

Furthermore, as shown by the page programming status 704, if the sum of the offset value and the data length of the ECC/CW as the write target exceeds the page size, the part of the data exceeding the page size is programmed from the head of the page. For example, if the offset value is 3072 bytes and the data length of the ECC/CW for which write is performed is 2048 bytes, the total value of the offset value and the ECC/CW, which is 5120 bytes, exceeds the page size, which is 4096 bytes. In this case, the former half of the data for the amount of 1024 bytes of the ECC/CW is programmed from the offset value, and the latter half of the data for the amount of 1024 bytes exceeding the page size is programmed on the head of the page. The method of programming by dividing the data as explained above is explained in detail later.

As explained above, by increasing the offset value, the offset is sequentially changed considering a certain number of times of write to be a cycle, and the programming frequency in the page can be leveled. It should be noted that, though 128 bytes are added to the offset value each time data is written, the method is not limited to such example, the ECC/CW length may also be increased each time data is written. In this case, it is possible to reduce the data amount of the management information related to the offset and to simplify the target specification address at the time of read/write processing for the flash memory.

In the above-mentioned method, the cell whose data is unprogrammed in the page does not apply any electrons to the floating gate by penetrating the oxidized insulation layer, and therefore deterioration does not progress. By changing the location of this type of unprogrammed cell where deterioration does not progress in the page sequentially, the sole deterioration of a specific cell in the page can be prevented. For example, it is assumed that the data is programmed in each cell with the probability 80% each time data is written to the page. In this case, for 1000 times of writing to the page, the data will be programmed in the cell for an average of 800 times. Subsequently, if 1250 times of writing to the page occurs, the 100th programming will be performed actually for each of the cells for the first time. Therefore, for example, for utilizing the flash memory whose upper limit value of the erase count is specified as 1000 times, if the probability of being actually programmed is 80%, 1250 times of erasure processing can be performed, and the lifetime extension of the entire storage apparatus can be achieved.

Next, the data write processing for the flash memory is explained. Firstly, the processor 115 transfers the write data to the flash memory. Specifically speaking, the processor 115 specifies a block and a page in the flash memory as the write target, and further specifies the offset in the page by the address. Next, the processor 115 transfers the write data to the register in the flash memory in order of transfer address. Subsequently, after completing the transfer to the flash memory, the processor 115 issues a write command specifying write to the page to the flash memory. Subsequently, the flash memory which received the write command programs the value written to the internal register in the relevant page.

Figure 7:
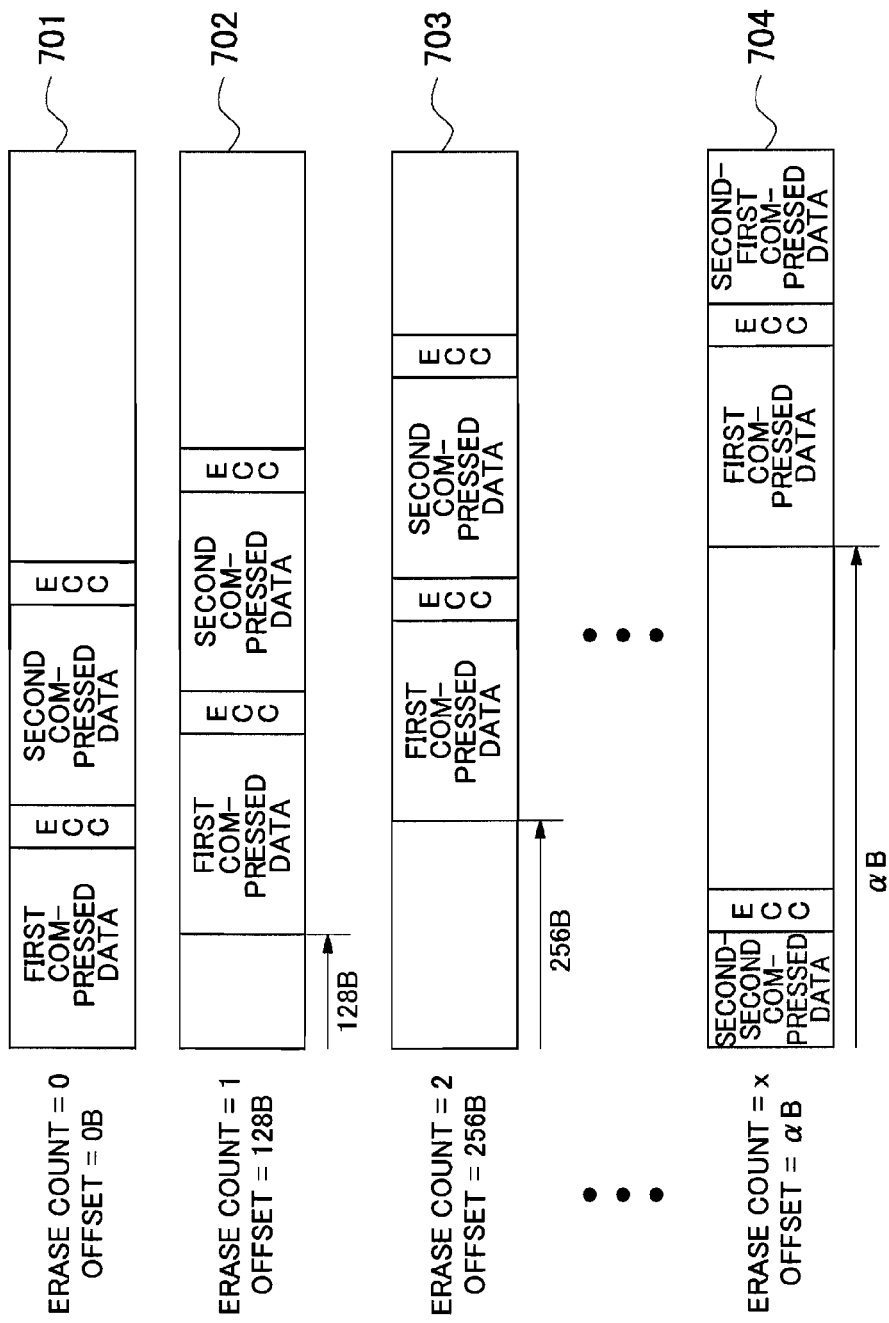
FIG. 7 is a conceptual diagram showing the overview of the write processing related to the same embodiment.

In the program statuses 701 to 703 shown in FIG. 7, data programming is performed by sequentially changing the offset by the above-mentioned method. However, in the page programming status 704, the areas to be programmed are not sequential in the page, specification of the data programming starting locations and data transfer must be performed in two batches.

Figure 8:
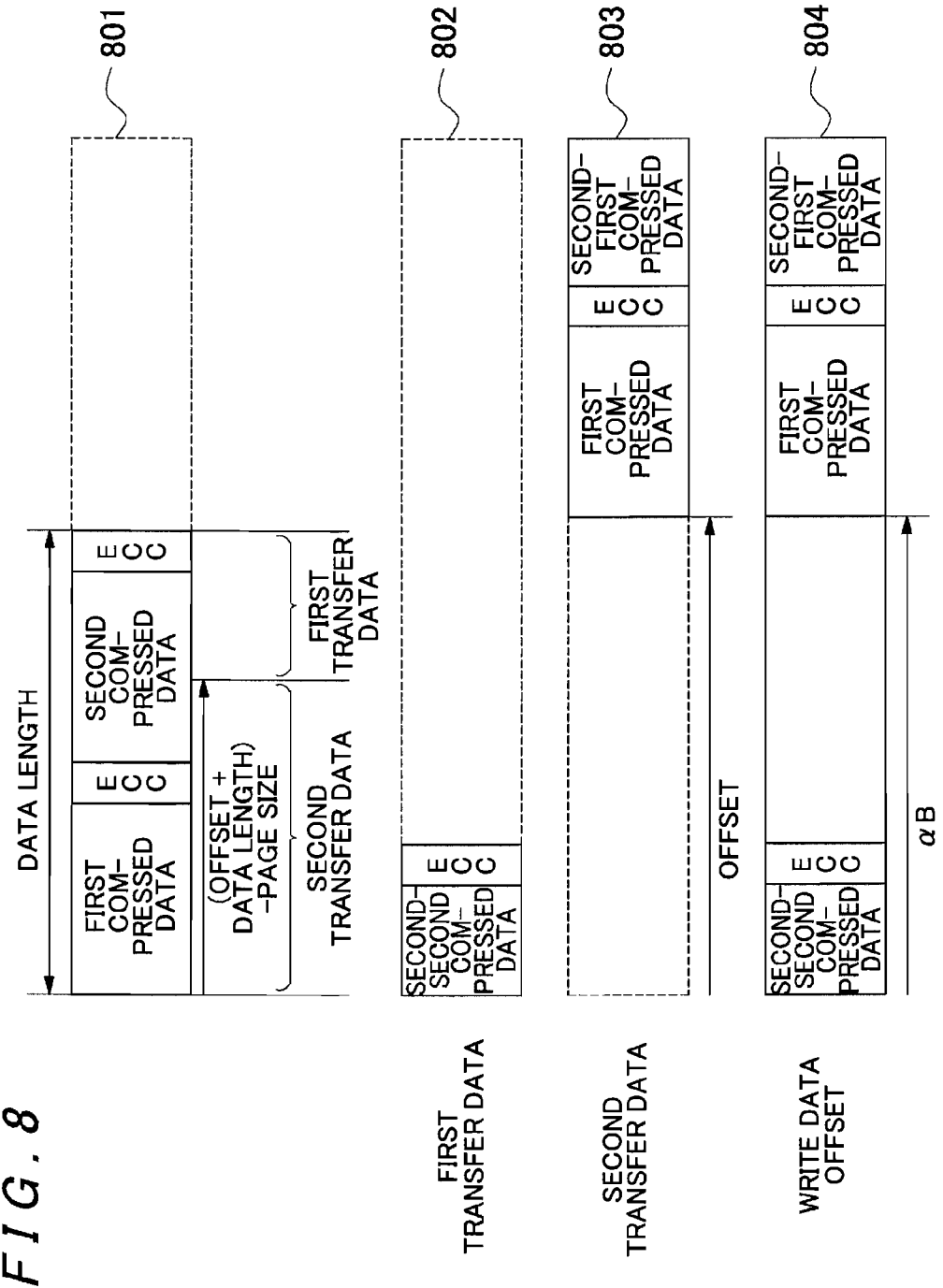
FIG. 8 is a conceptual diagram showing the overview of the write processing related to the same embodiment.

Here, the details of the page programming status 704 shown in FIG. 7 are explained with reference to FIG. 8. In FIG. 8, the case where a plurality of units of ECC-added data 801 are created in the data buffer 116 of the flash memory controller 110 by the write data creation processing shown in FIG. 6 is explained.

Firstly, the processor 115 ascertains the offset based on the erase count for the block as the write target. Subsequently, the processor 115 causes the data compression/decompression unit 118 to ascertain the compressed data length and acquires the number of ECC/CWs to be written from the relevant compressed data length. Next, the processor 115 ascertains the starting location of the first transfer data 802 in the buffer by the formula below.

Formula 1

$$\text{Starting location of first transfer data} = (\text{offset value} + \text{transfer data length}) - \text{page size} \quad (1)$$

Specifically speaking, the processor 115 adds the transfer data length of the write target ascertained from the number of ECC/CWs to the ascertained offset value, subtracts the page size from the value of the addition, and ascertains the starting location of the first transfer data 802 in the buffer. Though the data on and after the starting location ascertained by the above-mentioned formula (I) is considered to be the first transfer data 802 while the data before the starting location is considered to be the second transfer data 803 in the present embodiment, it is also possible to consider the data before the starting location to be the first transfer data and the data on and after the starting location to be the second transfer data.

Subsequently, the processor 115 notifies the PBA which specifies the page as the write target and the programming starting location of the first transfer data in the page to the flash memory interface 117, and instructs the transfer of the first transfer data 802 to the flash memory. The flash memory interface 117 which received the instruction from the processor 115 ascertains the write target flash memory and the internal block and the page of the same based on the notified PBA. Next, the flash memory interface 117 transfers the addresses of the block and the page to the write target flash memory. Next, for writing the first transfer data 802 from the head of the page, the flash memory interface 117 instructs the programming starting location 0 to the write target flash memory, and subsequently transfers the first transfer data 802 to the flash memory.

Subsequently, the processor 115 notifies the PBA specifying the write target page and the offset as the programming starting location of the second transfer data 803 in the page to the flash memory interface 117, and instructs the transfer of the second transfer data 803 to the flash memory. The flash memory interface 117 which received the instruction from the processor 115 ascertains the write target flash memory and the internal block and the page of the same based on the notified PBA. Next, the flash memory interface 117 transfers the addresses of the block and the page to the write target flash memory. Next, the flash memory interface 117 instructs the offset value as the programming starting location of the second transfer data 803 to the target flash memory, and subsequently transfers the second transfer data 803 to the target flash memory.

Subsequently, after completing the transfer of the first transfer data 802 and the second transfer data 803, the flash memory interface 117 notifies the write target flash memory that the data transfer is completed, and instructs page programming. By this method, in the write target page, the first transfer data 802 (the second-second compressed data) which is transferred on the head of the page for the first time is programmed, and the second transfer data 803 (the first compressed data and the second-first compressed data) transferred from the offset of the page for the second time is programmed (page programming status 804).

The data write processing in the case where the areas to be programmed in the page are separated, not sequential, is explained above. According to the above-mentioned data transfer processing, since only the data required for the flash memory must be transferred, the time required for the data transfer can be shortened, and the performance of the entire apparatus can be improved.

Figure 9:
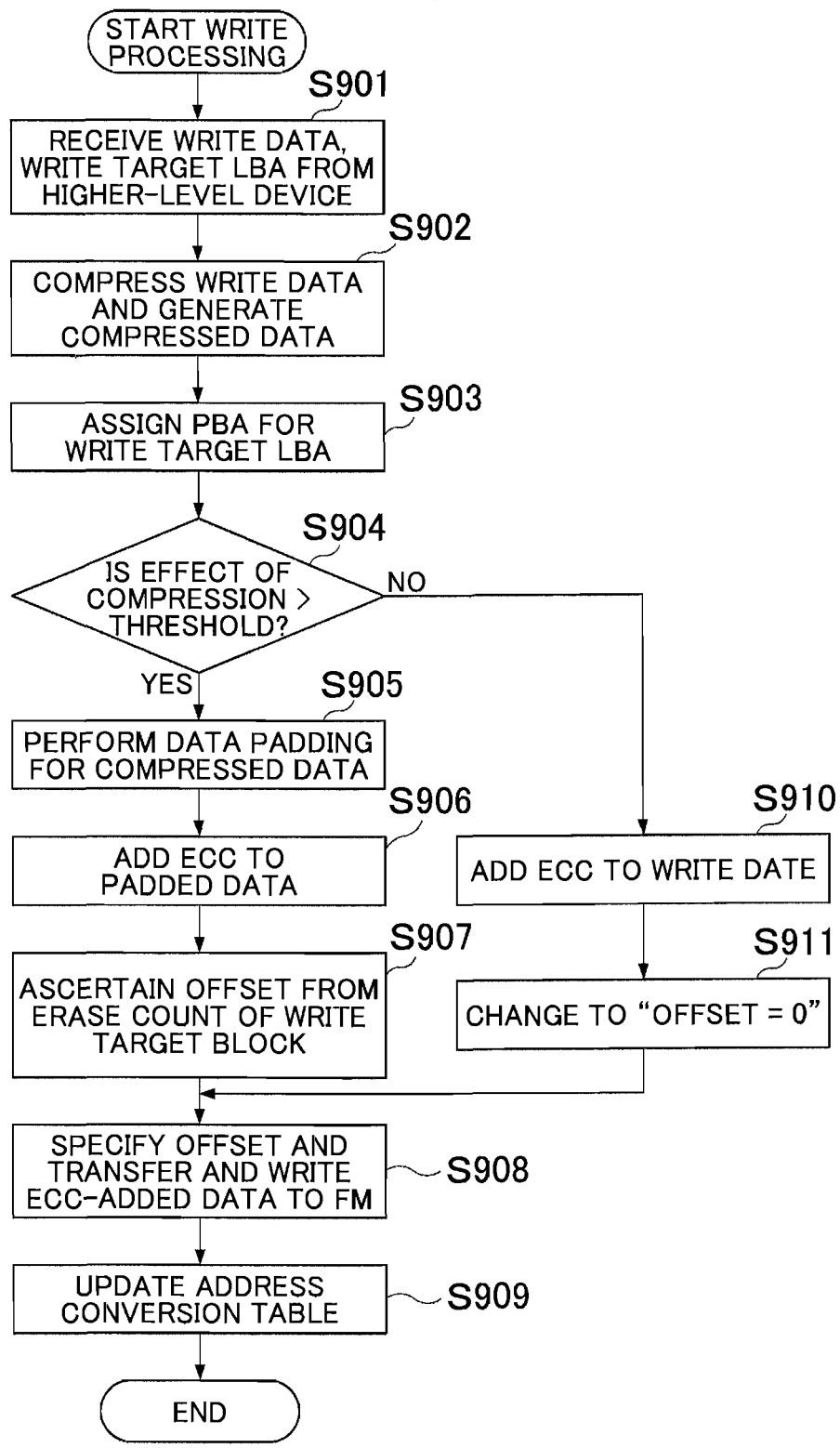
FIG. 9 is a flowchart showing the processing procedure of the write processing related to the same embodiment.

(1-5) Processing Procedures of Various Types of Processing (1-5-1) Details of Write Processing Next, the processing procedure of the write processing in the present embodiment is explained. As shown in FIG. 9, firstly, the processor 115 receives an LBA specifying received write data and a write target area from the higher-level device 101 (S901). Specifically speaking, the processor 115 receives the write request from the higher-level device 101 via the disk interface 111 and instructs the disk interface 111 to write the received write data to the data buffer 116. The disk interface 111 instructed from the processor 115 to write the received write data writes the received write data to the data buffer 116.

Next, the processor 115 divides the received write data stored in the data buffer 116 at step S901 in page units, and compresses the divided write data individually (S902). Specifically speaking, the processor 115 notifies the address of the write data stored in the data buffer 116 and the storage destination address of the compressed data in the buffer to the data compression/decompression unit 118, and instructs lossless compression to the data compression/decompression unit 118. The data compression/decompression unit 118 reads the write data from the data buffer 116 based on the address notified to the processor 115, and compresses the relevant data. Subsequently, after generating the compressed data, the data compression/decompression unit 118 writes the relevant compressed data to the data buffer 116, and notifies the data length of the compressed data to the processor 115. The processor 115 notified of the data length of the compressed data from the data compression/decompression unit 118 ascertains the number of ECC/CWs to be written in accordance with the data length of the compressed data. Specifically speaking, the processor 115 divides the compressed data length by the protected data length per ECC/CW and, if there is a surplus, the value to which 1 is added is considered to be the number of ECC/CWs.

Subsequently, the processor 115 assigns the PBA of the page to which the data is actually written to the write target LBA (S903). As a certain number of pages to which no data is written are pooled in the semiconductor storage apparatus 100, the processor 115 acquires the PBA of the page for the capacity required for storing the write data from the pooled pages, and assigns the acquired PBA to the LBA. It should be noted that, from the perspective of wear leveling, as for the write target page, the page of the block whose erase count is relatively small may also be selected from the pages to which no data is written.

Subsequently, the processor 115 ascertains the amount of the reduced data from the data length of the compressed data notified from the data compression/decompression unit 118 at step S902, and determines whether the compression has any effect or not (S904). Specifically speaking, the processor 115 ascertains the difference between the data length of the write data received at step S901 and the data length of the compressed data notified at step S902 and determines whether the ascertained value is equal to or greater than the threshold or not. If the ascertained value is equal to or greater than the threshold at step S904, the processor 115 determines that the effect of compression can be recognized, and proceeds to the processing at step S905 for performing the processing of writing the compressed data to the flash memory. Meanwhile, if the ascertained value is smaller than the threshold at step S904, the processor 115 determines that no effect of compression can be recognized, and proceeds to the processing at step S910 for performing the processing of writing the uncompressed write data to the flash memory.

It should be noted that an appropriate value for the entire system is specified as the threshold used at step S904. For example, the compression may also be determined to have effect if the difference between the numbers of ECC/CWs before and after the compression is equal to or greater than a specified value. Furthermore, if the effect of compression equal to or greater than the data length protected by the ECC/CW is not recognized even if the write data is compressed, the data length of the transfer data transferred to the flash memory by the padding processing is not reduced at all, and therefore the performance of the entire apparatus cannot be improved. However, as the padding data is recorded with the data for deterioration reduction added to the compressed data in the flash memory, it is possible to reduce deterioration for the cell which records padding data. Furthermore, ultimately, if randomization of write data and others are required, the compressed data may also be recorded even if no effect of compression is obtained. However, in this case, no effect of deterioration reduction can be obtained. In the present embodiment, taking the above-mentioned plurality of effects into consideration, an appropriate value for the entire system is set as the threshold.

If it is determined at step S904 that the difference between the data lengths before and after the compression is equal to or greater than a specified threshold, the processor 115 performs padding of the data for ascertaining the ECC for the compressed data (S905). Specifically speaking, the processor 115 divides the compressed data 602 shown in FIG. 6 by the data length per ECC/CW, and checks whether any data below the protected data length per ECC/CW exists or not. Subsequently, the processor 115 adds padding data 605 to the compressed data (the second compressed data 604 in FIG. 6) below the protected data length per ECC/CW and generates padded compressed data (the second' compressed data 608).

Meanwhile, if it is determined at step S904 that the difference between the data lengths before and after the compression is smaller than a specified threshold, the processor 115 adds an ECC without compressing the write data (S910). If the write data is not compressed, the data length of the write data and the page size are of the same value, and therefore the processor 115 changes the offset to 0 (S911) and performs the processing at step S908 and later.

Subsequently, the processor 115 ascertains an ECC for the compressed data generated at step S902 or the padded compressed data generated at step S905, adds the ascertained ECC to the compressed data, and generates an ECC/CW (S906). Specifically speaking, the processor 115 notifies the address of the compressed data or the padded compressed data in the data buffer 116 to the flash memory interface 117, causes the flash memory interface 117 to ascertain the ECC, and instructs the flash memory interface 117 to add the relevant ECC to the compressed data. The flash memory interface 117 which is instructed by the processor 115 reads the target data instructed by the data buffer 116 in units of protected data, and ascertains the ECC. Here, the protected data indicates the data as the target whose bit error is corrected by the ECC to be added. Subsequently, the flash memory interface 117 adds the ascertained ECC to be sequential to the protected data and stores the ECC-added data in the data buffer 116 again.

Subsequently, the processor 115 ascertains the offset of the block as the write target (S907). Specifically speaking, the processor 115 ascertains the offset based on the erase count for the write target block. The processor 115 stores the data by using the common offset to all the pages in the block. For example, the processor 115 shifts the offset by 128 bytes each time the erase count is increased by one. If the page size of the flash memory is 4096 bytes, the processor 115 returns the offset to 0 once every 32 times of the erase count. By this method, once in each cycle of the erase count which is 32 times, the offset of the same value can be acquired, and the programming frequency for each of the cells will be leveled. It should be noted that, though the method in which addition is performed for the offset per erase count is used in the present embodiment, the method is not limited to the above if the value for leveling the programming frequency for the cells in the page can be acquired each time data is written.

Subsequently, the processor 115 specifies the offset ascertained at step S907, transfers the ECC-added data generated at step S906 to the flash memory, and performs the write processing for the flash memory (S908). Specifically speaking, the processor 115 notifies the offset value ascertained at step S907, the address in the buffer for storing the ECC-added data generated at step S906, the total number of ECC/CWs ascertained at step S904 (the data length of the write data), and the PBA specifying the write destination to the flash memory interface 117, and instructs write to the flash memory. The flash memory interface 117 instructed to write to the flash memory by the processor 115 writes the data to the relevant page in the flash memory specified by the PBA.

Subsequently, after writing the data to the flash memory, the processor 115 updates the address conversion table 500. Specifically speaking, the processor 115 stores the PBA acquired at step S902 in the relevant field in the address conversion table 500 relevant to the LBA specified from the higher-level device 101. Subsequently, if the write data is compressed and written to the flash memory, the processor 115 also stores the number of ECC/CWs, the data length of the compressed data, and the offset value in the respective fields. Meanwhile, if the write data is written to the flash memory without compression, the processor 115 also stores the maximum value as the number of ECC/CWs that can be stored in the page and the offset 0 in the respective fields of the address conversion table 500.

(1-5-2) Details of Read Processing

Figure 10:
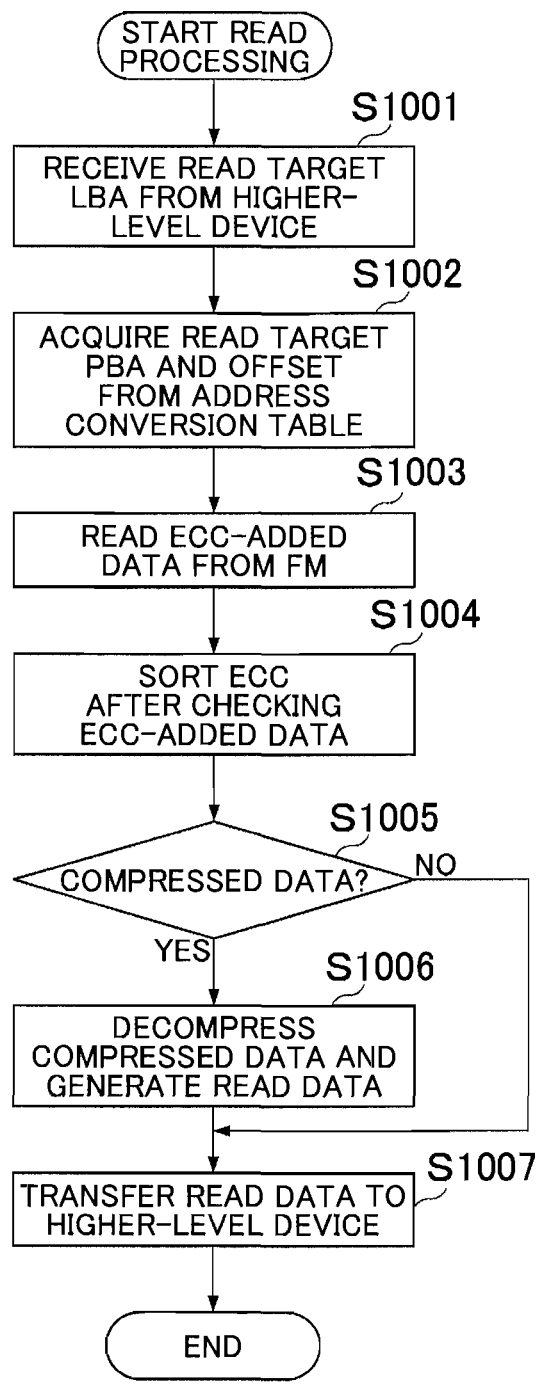
FIG. 10 is a flowchart showing the processing procedure of the read processing related to the same embodiment.

Next, the processing procedure of the read processing in the present embodiment is explained. As shown in FIG. 10, firstly, the processor 115 receives an LBA specifying the read target area from the higher-level device 101 (S1001). Specifically speaking, the processor 115 receives the read request from the higher-level device 101 via the disk interface 111, and performs the processing at the S1002 and later based on the relevant read request.

Subsequently, the processor 115 refers to the address conversion table 500 and acquires the PBA and the offset corresponding to the LBA received from the higher-level device 101 at step S1001 (S1002). Specifically speaking, the processor 115 refers to the address conversion table 500, acquires the value of the compressed data length field 504 corresponding to the received PBA, and recognizes whether the data stored in the read target PBA is compressed data or uncompressed data based on the value of the compressed data length.

Subsequently, if the read target data is recognized as the compressed data, the processor 115 acquires the value in the offset field 505 of the address conversion table 500, and specifies the same as the offset value of the read target. Furthermore, if the read target data is recognized as the compressed data, the processor 115 acquires the value stored in the number of ECC/CWs field 503 of the address conversion table 500. Furthermore, the processor 115 adds the data length of the read target ascertained based on the number of ECC/CWs to the offset. The processor 115 multiplies the data length per ECC/CW by the number of ECC/CWs and ascertains the read target data length. If the value of the addition ascertained by adding the offset value to the read target data length exceeds the page size, the processor 115 determines that the data is stored in the read target page non-sequentially (the page programming status 704 in FIG. 7). Meanwhile, if the data stored in the read target page is uncompressed data, the processor 115 changes the offset to 0 and determines that no other value than the PBA is required to be acquired from the address conversion table 500.

Next, the processor 115 reads the ECC-added data from the flash memory (S1003). Specifically speaking, the processor 115 notifies the offset value acquired at step S1102, the total number of ECC/CWs (data length) acquired at step S1001, and the PBA specifying the read target page to the flash memory interface 117, and instructs read from the flash memory. The flash memory interface 117 instructed to read from the flash memory by the processor 115 reads the data from the relevant page in the flash memory specified by the PBA. Specifically speaking, the flash memory interface 117 reads the data for the amount of the total number of ECC/CWs from the location specified by the offset, and writes the same to the data buffer 116.

Furthermore, if it is determined at step S1002 that the data is stored in the read target page non-sequentially, the processor 115 reads the data in two batches. Specifically speaking, firstly, the processor 115 notifies the offset value acquired at step S1102, the data length from the offset to the last location of the page as the data length of the first transfer data, and the PBA specifying the read target page to the flash memory interface 117, and instructs read from the flash memory. The flash memory interface 117 instructed to read from the flash memory by the processor 115 reads the first transfer data from the relevant page in the flash memory specified by the PBA, and writes the same to the data buffer 116. Next, the processor 115 changes to offset to 0, notifies the total number of ECC/CWs acquired at step S1001 as the data length of the second transfer data (data length), the difference of the data length of the first transfer data, and the PBA specifying the read target page to the flash memory interface 117, and instructs read from the flash memory. The flash memory interface 117 instructed to read from the flash memory by the processor 115 reads the second transfer data from the relevant page in the flash memory specified by the PBA, and writes the second transfer data to the location which is sequential to the end of the first transfer data in the data buffer 116.

Subsequently, the processor 115 causes the flash memory interface 117 to check the ECC-added data read at step S1003 and then sort the ECCs (S1004). Specifically speaking, the flash memory interface 117 checks the ECCs of the ECC-added data acquired at step S1003 by the ECC check circuit embedded in the flash memory interface 117. Here, if the detected number of failure bits exceeds the number of bits which can be corrected by the ECC, the processor 115 notifies that the data is lost to the higher-level device 101. Meanwhile, if the detected number of failure bits is equal to or below the number of bits which can be corrected by the ECC, the flash memory interface 117 corrects the failure bits. After these types of ECC check processing, the flash memory interface 117 writes the data from which the ECC is removed to the data buffer 116 as the padded compressed data, the compressed data, or the uncompressed data.

Subsequently, the processor 115 determines whether the data written to the data buffer 116 is compressed data or not (S1005). Specifically speaking, the processor 115 determines whether the data written to the data buffer 116 is compressed data or not based on the value of the compressed data length acquired at step S1001.

If it is determined at step S1005 that the data written to the data buffer 116 is compressed data, the processor 115 decompresses the compressed data and generates the read data (S1006). Specifically speaking, the processor 115 obtains the information of the part which is padded to the compressed data based on the value of the compressed data length acquired at step S1001. Subsequently, the processor 115 instructs the head address of the storage location of the compressed data in the buffer and the compressed data length to the data compression/decompression unit 118. The data compression/decompression unit 118 instructed to decompress the compressed data by the processor 115 reads from the head address of the compressed data to the compressed data length in the data buffer 116 as one unit of compressed data, and decompresses the relevant compressed data. Subsequently, the data compression/decompression unit 118 writes the decompressed data to the data buffer 116 again.

Meanwhile, if it is determined at step S1005 that the data written to the data buffer 116 is not compressed data (is uncompressed data), the processor 115 performs the processing at step S1007.

Subsequently, the processor 115 transfers the data stored in the data buffer 116 to the higher-level device 101 (S1007).

(1-6) Effects of Present Embodiment

As explained above, in the present embodiment, compression is performed in units of page size, and the programming starting location is sequentially changed for the data of which the effect of compression can be recognized. By this method, the programming frequency for the cells in the page can be leveled, the sole excessive deterioration of a specific cell in the page can be prevented, and the lifetime extension of the storage apparatus cannot be achieved.

It should be noted that, though the control and management of the unprogrammed areas in the cells in the page are indirectly performed by changing the offset in the present embodiment, the unprogrammed areas in the page may also be directly controlled and managed. For example, the method in which the area to be made unprogrammed in the page in units of ECC/CWs is specified can be considered. Specifically speaking, in the configuration where four ECC/CWs are stored in the page, the data is stored so that the area corresponding to the third ECC/CW is made an unprogrammed area. Subsequently, it is registered in the management information that the third ECC/CW area is an unprogrammed area. Subsequently, if the data is erased and the data is stored again, the data is stored so that the area corresponding to the fourth ECC/CW is made an unprogrammed area. Subsequently, it is registered in the management information that the fourth ECC/CW area is an unprogrammed area. As explained above, by changing the ECC/CW area to be made unprogrammed each time data is written and storing the page number in the ECC/CW which is made an unprogrammed area in the management information, the equivalent effect to the effect which can be obtained by changing the offset of the present embodiment can be obtained.

(2) Embodiment 2

(2-1) Configuration of Semiconductor Storage Apparatus

As the configuration of the semiconductor storage apparatus 100' related to the present embodiment is the same as the configuration of the semiconductor storage apparatus 100 related to the Embodiment 1, the detailed explanation is omitted. In the present embodiment, the semiconductor storage apparatus 100' by which the same effect as the Embodiment 1 can also be obtained in cases where an MLC (Multi Level Cell)-type flash memory is used is explained. For example, in the MLC (Multi Level Cell)-type flash memory, a plurality of pages in the same block are shared by one cell. Therefore, if compressed data and uncompressed data are mixed and stored in the same block, even if the compressed data is stored in one page and an unprogrammed area is created, it becomes impossible to create an unprogrammed cell if uncompressed data is programmed in another page which shares the cell. Furthermore, in cases where the data of which the effect of compression is small is written in the page which shares the cell, similarly, the number of expected unprogrammed cells is decreased. Furthermore, the large-capacity storage apparatus has a problem that the amount of information in the management information becomes large in the configuration where ECC/CWs to be written are stored per page as explained in the Embodiment 1.

Therefore, in the present embodiment, for solving the above-mentioned problem, the write control is performed so that the number of ECC/CWs stored in a block may be as equal as possible. Specifically speaking, as much data as possible of which effect of compression is equal is collected per block and stored. Furthermore, in the page where compressed data is stored, the information of the data length of the compressed data is stored along with the compressed data. By this method, the compressed data can be managed in units of blocks and the amount of information in the management information can be reduced. In the present embodiment, specifically, the configuration where the similarity of the effect of compression is managed by the accuracy in units of ECCs is explained.

It should be noted that the determination whether the effect of compression is similar among the compressed data or not is not limited to the determination in units of ECC/CWs, and other units may also be permitted. Furthermore, the unit by which the data of the equal effect of compression is collected and stored is not limited to the block, and other units may also be permitted. For example, the data of the equal effect of compression may also be stored in units of bytes in two pages sharing one cell. In this case, the effect of compression may not have to be exactly equal. For example, as a "write data group whose data reduction amount by compression is from 120 bytes to 240 bytes" and a "write data group whose data reduction amount by compression is from 240 bytes to 360 bytes", it is also possible to create a range of the effect of compression and determine the similarity of the effect of compression. As the accuracy of the standard for determining the similarity of the effect of compression, the unit by which the data of the effect of compression is compiled, and others is higher, the effect of deterioration reduction is improved. Meanwhile, the management information will increase as the accuracy of the standard for determination, the unit, and others is higher.

(2-2) Data Configuration

Though the flash memory of the MLC type is illustrated and explained, the internal configuration of the flash memory 120 in the present embodiment is the same as the configuration in the Embodiment 1, the detailed explanation is omitted.

(2-3) Configuration of Various Types of Management Information

In the management information stored in the RAM 113 of the semiconductor storage apparatus 100', an address conversion table 1100 is explained. The address conversion table 1100 is a table for managing the address correspondence between the LBAs and PBAs and configured from an LBA field 1101 and a PBA field 1102 as shown in FIG. 11. The address conversion table 1100 is configured per page size in the LBA (e.g. every four kilobytes). In the LBA field 1101, the head address of a data range to be stored in a page is stored sequentially. Meanwhile, in the PBA field 1102, an address by which a page can be uniquely specified from a plurality of flash memories installed in the semiconductor storage apparatus 100' is stored.

Next, in the management information stored in the RAM 113 of the semiconductor storage apparatus 100', block management information 1200 is explained. The block management information 1200 is a table for managing various types of information per block size (e.g. one megabyte) and configured from a PBA group field 1201, a erase count field 1202, a number of ECC/CWs field 1203, a cumulative degree of deterioration field 1204, and a last write page field 1205 as shown in FIG. 12. In the PBA group field 1201, as an address uniquely specifying a block from a plurality of flash memories installed in the semiconductor storage apparatus 100', the address indicating the head page of the block is stored. The erase count performed for the block which the address stored in the PBA group field 1201 indicates is stored in the erase count field 1202. The relevant erase count is a cumulative value of the erase count performed since the start of the operation of the semiconductor storage apparatus 100'. The number of ECC/CWs of the data stored in all of the pages in the block which the address stored in the PBA group field 1201 indicates is stored in the number of ECC/CWs field 1203. The compressed data with the same number of ECC/CWs is stored in each of the pages in a single block in the present embodiment. Therefore, the value stored in the number of ECC/CWs field 1203 is the number of ECC/CWs of the pages in the relevant block. Furthermore, as for uncompressed data, similarly, a value which indicates the block is the block which stores uncompressed data only is stored in the number of ECC/CWs field 1203. Furthermore, as for an invalid block, a value which indicates the block is an invalid block is stored in the number of ECC/CWs field 1203. In the present embodiment, the number of ECC/CWs to be stored in each of the blocks is changed each time erasure is performed, and the deterioration of each of the blocks is leveled as much as possible.

The cumulative value of the degrees of deterioration which occurred due to programming for the cells in the page is stored in units of programming in a cumulative degree of deterioration field 1204. The relevant cumulative degree of deterioration is added complying with the number of ECC/CWs as the erasure target when the block is erased. Specifically speaking, in the configuration where the maximum number of ECC/CWs that can be stored per page is four, the case where three of the ECC/CWs are written as a result of compressing the data is explained. In this case, addition actually occurs to three fourths of the cells in the page in the erasure operation for the block. Therefore, deterioration which occurs to the relevant block is actually 0.75 (three fourths of) times for one time of erasure operation. Similarly, in case of a block to which two ECC/CWs are written as a result of compressing the data, deterioration which occurs to the block is actually 0.5 (one-half) times for one time of erasure operation. As explained above, the value to which the actual degree of deterioration for the erasure operation is added is stored in the cumulative degree of deterioration field 1204. Therefore, in the configuration where the maximum number of ECC/CWs that can be stored per page is four, depending on the number of ECC/CWs to be the erasure target when the block is erased, any of the values 0.25, 0.5, 0.75, and 1 is added. The accuracy of prediction of the degree of deterioration per block is improved by using this cumulative degree of deterioration in the present embodiment.

Furthermore, the last page to which data is already written of the block which the address stored in the PBA group field 1201 indicates is stored in the last write page field 1205. As write must be performed in order of page number in the block as a characteristic of the flash memory, data must be written to the page of the next number to the page to which data is already written in the block when write is performed for the block. The processor 115 recognizes the write target page in the relevant block from the value stored in the last write page field 1205 and acquires the PBA. The write processing by the processor 115 is explained in detail later. It should be noted that the case where the last page number in the block which is 127 is stored in the last write page field 1205 indicates that write cannot be performed for the relevant block until the relevant block is erased.

(2-4) Overview of Write Processing

Next, the overview of the write processing performed by the processor 115 of the semiconductor storage apparatus 100' is explained. As the write processing related to the present embodiment is nearly the same as the write processing related to the Embodiment 1, the processing which is different from the Embodiment 1 is specifically explained in detail below. Firstly, the overview of the write processing in the present embodiment is explained with reference to FIG. 13.

Figure 13:
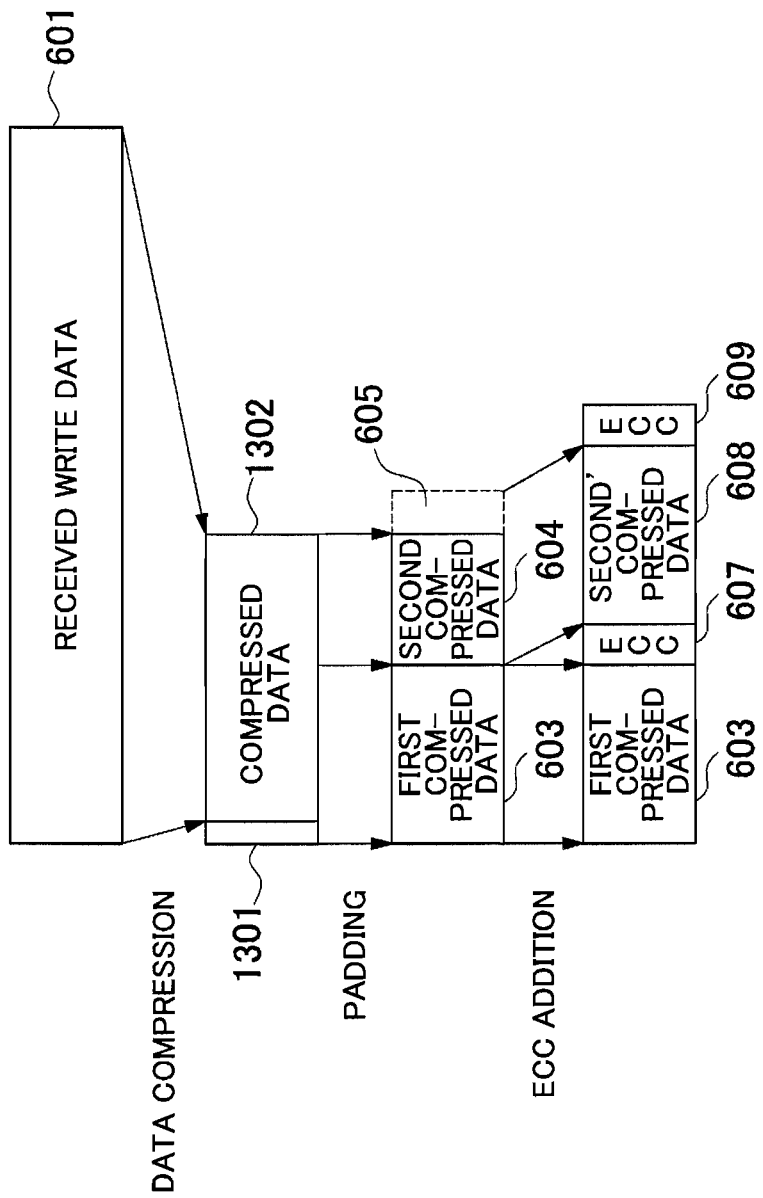
FIG. 13 is a conceptual diagram showing the overview of the write processing related to the same embodiment.

In the present embodiment, as in the Embodiment 1, after receiving received write data and a write destination address from the higher-level device 101, the processor 115 divides the write data by the page size. The received write data 601 shown in FIG. 13 is the data divided by the page size from the received write data received from the higher-level device 101. The processor 115 generates compressed data 1302 from the received write data 601 by using the data compression/decompression unit 118. Here, the processor 115 adds fixed length data 1301 in which the compressed data length of the generated compressed data 1302 is stored to the head of the compressed data 1302. As explained above, the compressed data length is stored in the same page as the compressed data in the present embodiment. By this method, it becomes possible to reduce the data amount stored in the RAM 113 compared with the cases as in the Embodiment 1 where the compressed data length is stored in the compressed data length field 504 of the address conversion table 500 shown in FIG. 5.

Subsequently, considering the fixed length data 1301 in which the compressed data length is stored and the compressed data 1302 to be one unit of data, the processor 115 partitions the relevant data by the protected data length determined by the ECC/CW, and generates the first compressed data 603 and the second compressed data 603 as in the Embodiment 1. Here, if the compressed data located in the address of the latter half of the page is below the protected data length determined by the ECC/CW, data for deterioration reduction (padding data 605) is added, and the padded second' compressed data 608 is generated. As the generation and addition of ECCs for each compressed data is the same as in the Embodiment 1, the detailed explanation is omitted.

(2-5) Processing Procedures of Various Types of Processing

(2-5-1) Details of Write Processing

Next, the processing procedure of the write processing in the present embodiment is explained. Among the write processing related to the present embodiment, the processing which is different from the write processing related to the Embodiment 1 is specifically explained in details below, and the detailed explanation of the similar processing is omitted.

Figure 14:
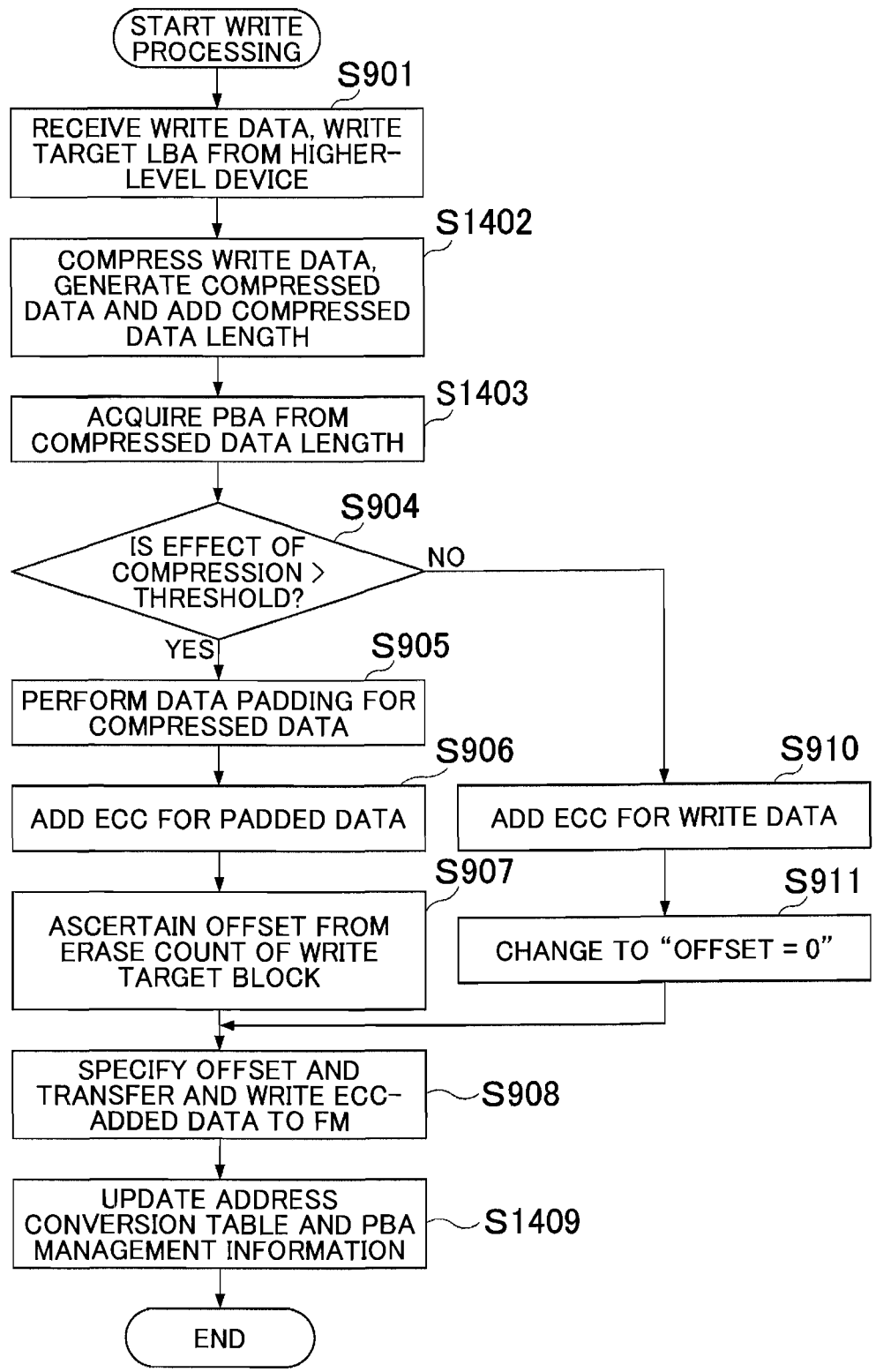
FIG. 14 is a flowchart showing the processing procedure of the write processing related to the same embodiment.

As shown in FIG. 14, firstly, the processor 115 receives an LBA specifying received write data and a write target area from the higher-level device 101 (S901). Subsequently, the processor 115 compresses the write data received at step S901, generates compressed data, and adds the data in which the compressed data length is stored to the head of the compressed data (S1402). Specifically speaking, the processor 115 notifies the address of the write data stored in the data buffer 116 and the storage destination address of the compressed data in the buffer to the data compression/decompression unit 118, and instructs lossless compression to the data compression/decompression unit 118. The data compression/decompression unit 118 reads the write data from the data buffer 116 based on the address notified to the processor 115, and compresses the relevant data. Subsequently, after generating the compressed data, the data compression/decompression unit 118 adds the data 1301 in which the compressed data length is stored to the relevant compressed data, and writes the same to the data buffer 116. Furthermore, the data compression/decompression unit 118 notifies the compressed data length to the processor 115.

Subsequently, the processor 115 searches the block to perform write for based on the compressed data length notified from the data compression/decompression unit 118 at step S1402, and acquires the page in the relevant block as the PBA of the write target page (S1403). The PBA acquisition processing at step S1403 is explained in detail later.

As steps from S905 to S908 and steps from S910 to S911 shown in FIG. 14 are the same processing as in the Embodiment 1, the explanation is omitted. In the present embodiment, after writing the data to the page specified by the PBA acquired at step S1403 (S908), the processor 115 updates the address conversion table and the PBA management information (S1409). Specifically speaking, the processor 115 refers to the address conversion table 1100 and stores the PBA acquired at step S1403 in the PBA field 1102 corresponding to the LBA acquired at step S901. Furthermore, the processor 115 refers to the block management information 1200 and adds 1 to the value in the last write page field 1205 to which the PBA group including the PBA acquired at step S1403 is relevant.

Next, the details of the PBA acquisition processing at the above-mentioned step S1403 are explained with reference to FIG. 15. As shown in FIG. 15, firstly, the processor 115 ascertains the number of ECC/CWs to be written to the page based on the compressed data length acquired at step S S902 (S1501). Specifically speaking, the processor 115 divides the compressed data length by the protected data length per ECC/CW and, if there is a surplus, the value to which 1 is added is considered to be the number of ECC/CWs to be written.

Subsequently, the processor 115 selects the candidate block for which write is performed from the block management information 1200 based on the number of ECC/CWs ascertained at step S1501 (S1502). Specifically speaking, the processor 115 refers to the block management information 1200, and selects the block whose value in the number of ECC/CWs field 1203 is equal to the number of ECC/CWs ascertained at step S1501 as the candidate for which write is performed.

Subsequently, among a plurality of candidate blocks for which write is performed selected at step S1502, the processor 115 excludes the block whose value in the last write page field 1205 indicates the last page of the block (e.g. 127) from the candidate blocks for which write is performed (S1503). The processor 115 excludes the block whose last write page is 127 at step S1503 because no page in which no data can be stored exists in the relevant block and because the relevant block is the block in which no data can be stored again until being erased once.

Subsequently, among the plurality of write block candidates, the processor 115 selects a block whose value stored in the cumulative degree of deterioration field 1204 is relatively small (S1504). It should be noted that the processor 115 may also select the block whose value stored in the cumulative degree of deterioration field 1204 is the smallest at step S1504.

Subsequently, the processor 115 determines whether the block to be the write target is selected or not (S1505). At step S1505, for example, if no block group relevant to the number of ECC/CWs to be written exists in the block management information 1200 or if all the blocks relevant to the number of ECC/CWs to be written are un-writable, the processor 115 considers that no block could be acquired and performs the processing at step S1507 and later. Meanwhile, if a block relevant to the number of ECC/CWs to be written is acquired at step S1505, the processor 115 performs the processing at step S1506 and later If it is determined at step S1505 that the block could be acquired, the processor 115 acquires the PBA specifying the unwritten page in the acquired block (S1506). Specifically speaking, the processor 115 refers to the block management information 1200 and acquires the last write page of the acquired block. Subsequently, the processor 115 considers the next page to the last write page to be the write target page, and acquires the PBA specifying the relevant page. As explained above, the data with the equal number of ECC/CWs will be written to all the pages in the block, and it becomes also possible to secure an unprogrammed area without fail in the flash memory of the MLC type.

Meanwhile, if it is determined at step S1505 that the block cannot be acquired, the processor 115 acquires the block whose cumulative degree of deterioration is small preferentially from the unwritten blocks (S1507). Specifically speaking, the processor 115 refers to the block management information 1200, selects a plurality of unused blocks as the candidates for the write target block, and furthermore selects the block whose value stored in the cumulative degree of deterioration field 1204 is relatively small as the block for newly storing the ECC/CWs from the candidates for the write target blocks. It should be noted that the processor 115 may also select the block whose value stored in the cumulative degree of deterioration field 1204 is the smallest from the candidates for the write target blocks at step S1507.

Subsequently, the processor 115 registers the number of ECC/CWs ascertained at step S1501 in the number of ECC/CWs field 1203 of the block management information 1200 corresponding to the block acquired at step S1507 (S1508). Subsequently, the processor 115 considers the head page of the block acquired at step S1507 to be the write target, and acquires the PBA specifying the head page (S1509).

(2-5-2) Details of Read Processing

Next, the processing procedure of the read processing in the present embodiment is explained. Among the read processing related to the present embodiment, the processing which is different from the write processing related to the Embodiment 1 is specifically explained in details below and the detailed explanation of the similar processing is omitted. As steps S1001, S1003 to S1005, and steps from S1006 to S1007 shown in FIG. 16 are the same processing as in the Embodiment 1, the explanation is omitted.

The processor 115 receives an LBA specifying the read target area from the higher-level device 101 (S1001), refers to the address conversion table 1100, and acquires the PBA corresponding to the LBA acquired at step S1001 (S1602). Subsequently, the processor 115 refers to the block management information 1200 and acquires the values stored in the erase count field 1202 and the number of ECC/CWs field 1203 corresponding to the PBA group including the PBA acquired at step S1602 (S1610). As the offset is ascertained from the erase count at step S907 in the above-mentioned write processing in the present embodiment, the offset set for each of the blocks can be ascertained from the erase count. Furthermore, as the same offset can be specified for all the pages in the block which the PBA group specifies, the offset of the read target page is ascertained from the erase count stored in the erase count field 1202.

Subsequently, after reading the ECC-added data from the flash memory (S1003) and checking the ECC-added data, the processor 115 sorts the ECCs (S1004), and determining whether the read target data is compressed data or not (S1005).

If it is determined at step S1005 that the read target data is compressed data, the processor 115 acquires the compressed data length from the compressed data whose ECCs are sorted at step S1004 or from the head area of the padded compressed data (S1611). Subsequently, the processor 115 decompresses the compressed data by using the compressed data length acquired at step S1611 and generates read data (S1006). Subsequently, the processor 115 transfers the read data generated at step S1006 to the higher-level device 101 (S1007).

(2-6) Effects of Present Embodiment

As explained above, in the present embodiment, compressed data is classified and storage blocks are selected in accordance with the number of ECC/CWs required for storing compressed data. By this method, the compressed data of the equal number of ECC/CWs is stored in all the pages in one block, and therefore it becomes possible to generate unprogrammed areas without fail even in cases where the flash memory of the MLC type is used and reduce deterioration which occurs due to programming. Furthermore, the management information stored in the RAM 113 can be reduced by managing the number of ECC/CWs of the data stored in units of blocks. Furthermore, the present invention can be achieved by using a small-capacity RAM 113 by storing the compressed data length in each of the pages.

(3) Other Embodiments

Though the data of which write is required from the higher-level device 101 is divided by the page size of the flash memory in the above-mentioned embodiments, the method is not limited to such examples. For example, it is also possible to divide the data of which write is required from the higher-level device 101 by the size smaller than the page size of the flash memory and change the starting location of writing the relevant divided data. By this method, similarly, the same effect as the above-mentioned embodiments can be obtained.

Furthermore, the cases where the processor is applied as the controller which controls the entire processing related to the various types of functions by the embodiments are described in the above-mentioned embodiments, the present invention is not limited to this, it is also possible to install hardware and software performing the processing as the controller separately from the processor. By this method, similarly, the same effect as the above-mentioned embodiments can be obtained.

INDUSTRIAL APPLICABILITY

The present invention is broadly applicable to various configurations of semiconductor storage apparatuses where flash memories are installed as storage media.

REFERENCE SIGN LIST

100: Semiconductor storage apparatus
101: Higher-level device
110: Flash memory controller
111: Disk interface
114: Switch
115: Processor
116: Data buffer
117: Flash memory interface
118: Data compression/decompression unit
120 to 128: Flash memory
201: Register
202 to 206: Block
301 to 307: Page

The invention claimed is:

1. A semiconductor storage apparatus including a flash memory which provides a storage area, and a memory controller which controls the reading and writing of data from and to the flash memory,
   wherein the storage area of the flash memory is configured from a plurality of write areas, and
   wherein the memory controller divides the data into a size corresponding to the write area, and changes the starting location of writing the data each time the divided data is written into the write area when writing new data to a first page
   wherein the storage area of the flash memory is divided into a plurality of blocks as an erase unit of the data, and managed by being further divided into a plurality of pages as a unit of reading or writing data,
   wherein the memory controller divides the data into a size corresponding to the page, and decides the starting location of writing the divided data according to an erase count of the block to which belongs the page where the data is to be written, and
   wherein the memory controller sets a value obtained by multiplying a predetermined value which equalizes the writing frequency of the data to the erase count of the block as the starting location of writing the page.

2. The semiconductor storage apparatus according to claim 1,
   wherein the memory controller is configured by comprising management information for associating and managing the page and the starting location of writing the page, and
   executes write processing of the data to the page based on the starting location of writing the page of the management information in the write processing of writing data into the flash memory.

3. The semiconductor storage apparatus according to claim 2,
   wherein the memory controller associates, with the management information, the page and the starting location of writing of the page and the data length of the data stored in the page, and
   executes read processing of the data based on the starting location of writing the page and the data length of the data of the management information in the read processing of reading data from the flash memory.

4. The semiconductor storage apparatus according to claim 1,
   wherein the memory controller divides the data into a size corresponding to the page, losslessly compresses the divided data, and writes the compressed data into the page.

5. The semiconductor storage apparatus according to claim 4,
   wherein the memory controller further divides the compressed data into a length according to the data length that is protected by an error correction code for detecting an error of the data, and writes data, in which the error correction code was added to each of the divided data, into the page.

6. The semiconductor storage apparatus according to claim 5,
   wherein, if data that was divided into a length according to the data length that is protected by the error correction code is less than the data length, the memory controller generates padded data by adding padding data for alleviating the deterioration of the data, and writes data, in which the error correction code was added to the padded data, into the page.

7. The semiconductor storage apparatus according to claim 5,
   wherein the memory controller associates and manages the number of divided data, in which the data was divided into the data length that is protected by the error correction code, and the block, and
   executes write processing of the data to the block corresponding to the number of divided data, in which the data was divided into the data length that is protected by the error correction code, in the write processing of writing data into the flash memory.

8. The semiconductor storage apparatus according to claim 7,
   wherein, when sharing the storage area of the flash memory with two or more pages, the memory controller executes write processing of the data to the block in which the data length of the data stored in the two or more pages sharing the storage area of the flash memory becomes equivalent in the write processing of writing data into the flash memory.

9. The semiconductor storage apparatus according to claim 8,
   wherein, when sharing the storage area of the flash memory with two or more pages, the memory controller executes write processing of the data by preferentially selecting the block based on the cumulative degree of deterioration according to the cumulative write amount among the blocks in which the data length of the data stored in the two or more pages sharing the storage area of the flash memory becomes equivalent in the write processing of writing data into the flash memory.

10. The semiconductor storage apparatus according to claim 9, wherein the cumulative degree of deterioration is a value based on the erase count.

11. A method of controlling a semiconductor storage apparatus including a flash memory which provides a storage area, and a memory controller which controls the reading and writing of data from and to the flash memory, wherein the storage area of the flash memory is divided into a plurality of blocks as an erase unit of the data, and managed by being further divided into a plurality of pages as a unit of reading or writing data, and wherein the method comprises:

a first step of the memory controller dividing the data into a size corresponding to the page;

a second step of the memory controller acquiring an erase count of the block to which belongs the page where the data is to be written; and a third step of the memory controller deciding the starting location of writing the divided data according to the erase count of the block, and changing the starting location of writing the data each time the divided data is written into a first page; and wherein the storage area of the flash memory is divided into a plurality of blocks as an erase unit of the data, and managed by being further divided into a plurality of pages as a unit of reading or writing data, wherein the memory controller divides the data into a size corresponding to the page, and decides the starting location of writing the divided data according to an erase count of the block to which belongs the page where the data is to be written, and wherein the memory controller setting a value obtained by multiplying a predetermined value which equalizes the writing frequency of the data to the erase count of the block as the starting location of writing the page.

* * * * *